United States Patent Office 3,232,964
Patented Feb. 1, 1966

3,232,964
2-ANDROSTEN-16-OL ESTERS
Max N. Huffman, 3300 N. Nevada Ave.,
Colorado Springs, Colo.
No Drawing. Filed Feb. 12, 1964, Ser. No. 344,197
4 Claims. (Cl. 260—397.5)

This application is a continuation-in-part of my copending application Serial No. 235,118, filed November 2, 1962, now abandoned.

This invention relates to 2-androsten-16-ol and esters thereof, as well as to methods of producing such compounds. More particularly, this invention relates to steroid compounds having the following general formula

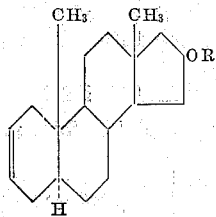

wherein R represents hydrogen, a lower alkanoyl radical, a lower carboxyalkanoyl radical or a lower alkanoxyalkanoyl radical.

The compounds of the foregoing formula stimulate the reticuloendothelial system of mammals. For instance, at a subcutaneous dose of 0.5 milligram per day for six days in the male mouse 2-androsten-16-ol significantly stimulates the reticuloendothelial system of the mouse without any toxic effects. 2-androsten-16-ol as well as its hemisuccinate produced no virilizing effect when given orally at 2 milligrams per day for fourteen days to young intact male rats, the size of the prostate, testes and levator ani not being different from the controls.

The reticuloendothelial system plays an important part in cholesterol metabolism. Cholesterol-containing macromolecular aggregates appear to be phagocytosed by cells of the reticuloendothelial system. Stimulation of the reticuloendothelial system accelerates the reduction in blood cholesterol levels. It has been observed that premenopausal women are virtually immune from coronary thrombosis, and these observations led to the study of the effect of certain sex hormones in experimental and clinical atherosclerosis. These studies indicate that certain sex hormones cause clinical improvement as well as a reversion toward normal of the blood lipid picture in hypercholesterolemic individuals. On the basis of such studies, it has been concluded that hormones may have a useful role in therapy or prophylaxis of disorders associated with abnormal levels of cholesterol in the bood, and that the efficacy of these substances may be due to their stimulating effect upon the reticuloendothelial system. A major limiting factor in the use of hormones lies in their concomitant sexual effect. Therefore, it is desirable to produce steroids having an effect upon the reticuloendothelial system without undesired sexual activity.

It is an object of this invention to provide steroids which have useful physiological properties. An additional object is to provide steroids which stimulate the reticuloendothelial system which have a negligible virilizing effect on mammals. It is another object of this invention to provide efficient methods for producing such steroids. A further object is to provide novel steroids of the series comprising 2-androsten-16-ol and esters thereof which have useful physiological properties, particularly with respect to stimulation of the reticuloendothelial system. A further object is to provide efficient methods for producing such compounds from known starting materials. These and other objects are apparent from and are achieved in accordance with the following disclosure.

In the compounds of the general formula given above, R can represent hydrogen or an ester group. The ester group can be a lower alkanoyl radical such as acetyl, propionyl or butyryl. It can also be a lower carboxyalkanoyl radical of the formula —CO(CH$_2$)$_n$COOH wherein $n$ is an integer from 1 to 4, inclusive, such as a hemi-succinyl radical [—COCH$_2$CH$_2$COOH]. R can also represent a lower alkanoxyalkanoyl radical of the formula —COAlkOCOR', wherein R' is a lower alkyl radical such as methyl, ethyl or propyl and Alk is an akylene radical or similar bivalent aliphatic radical containing 1 to 3 carbon atoms, inclusive. The preferred alkanoxyalkanoyl radical is the acetoxyacetyl radical but related radicals are included in the compounds of this invention, such as the propionoxypropionyl radical.

The compounds of this application are produced from 2-androsten-16-one which can be synthesized according to the procedure of Fajkos and Sorm, Chemicke Listy, vol. 47, pages 1207–1213 (1953). The keto group of 2-androsten-16-one can be reduced by reaction with an alkali metal hydride of a metal of group IIIA of the periodic table, such as sodium borohydride, lithium aluminum hydride and potassium borohydride. This reaction is preferably carried out in a lower alkanol such as methanol, ethanol or similar aliphatic alcohol containing 1 to 5 carbon atoms. The reaction is usually conducted at room temperature, although temperatures in the range of 0–100° C. can be used. After the reaction between the alkali metal hydride of the metal of the group IIIA and the keto group of 2-androsten-16-one has been completed it is advantageous to add a low molecular weight ketone such as acetone or methyl ethyl ketone to destroy the excess of reducing agent. Then, the 2-androsten-16β-ol is removed from the reaction mixture, preferably by diluting the reaction mixture with water and refrigerating it. The steroid is insoluble in the dilute agueous solution and precipitates in the form of an insoluble oil. 2-androsten-16β-ol can be obtained from the insoluble oil by crystallization. Alternatively, 2-androsten-16β-ol in oily form can be converted into an ester such as the acetate by reaction with acetic anhydride or acetyl chloride in a tertiary amine solvent such as pyridine, quinoline, dimethylaniline or the like. This reaction is ordinarily carried out at room temperature but can be conducted at temperatures in the range of 0° to 100° C. The ester of 2-androsten-16β-ol can be isolated from the reaction mixture by dilution with water and refrigeration. The ester is insoluble in the dilute aqueous solution and separates out in crystalline form. It can be purified by recrystallization from a lower alkanol such as methanol or ethanol or from a lower aliphatic ketone such as acetone or methyl ethyl ketone. Purified 2-androsten-16β-ol can be obtained from the crystalline ester of 2-androsten-16β-ol by hydrolysis with alcoholic alkali such as a solution of sodium hydroxide in aqueous alkanol such as methanol or ethanol. This reaction is ordinarily carried out at reflux temperature in the range of 50–150° C. After the reaction has been completed, the 2-androsten-16β-ol can be isolated from the reaction mixture by dilution with water from which it separates as a crystalline material of high purity.

2-androsten-16α-ol can be produced from 2-androsten-16β-ol by epimerization of its tosylate with sodium acetate in hot acetic acid, according to the general method described in Huffman Patent No. 2,963,943, granted December 6, 1960. The resulting 2-androsten-16α-ol acetate can be hydrolyzed to 2-androsten-16α-ol with alcoholic alkali and the latter can be converted to various esters such as the acetate, propionate, hemi-succinate and the like as disclosed below.

Esters of 2-androsten-16-ol can be produced by reaction of 2-androsten-16-ol with organic acid anhydrides or halides in the presence of a tertiary amine solvent such as pyridine, quinoline or dimethylaniline. These reactions are generally carried out at temperatures in the range of 50–150° C. over a period of time varying from ½ to 10 hours. The ester of 2-androsten-16-ol can be isolated from the resulting reaction mixture by dilution with water followed by heating to a temperature of at least 90° C. to hydrolyze the excess of organic acid anhydride or halide. Thereafter, the reaction mixture can be further diluted with water and the insoluble steroid ester isolated therefrom by precipitation with cooling or by extraction with an organic solvent such as ether, chloroform, petroleum ether or the like. The esters can be purified by recrystallization from lower alkanols such as methanol, ethanol and mixtures thereof with water as well as lower aliphatic ketones such as acetone and methyl ethyl ketone as well as aqueous mixtures thereof.

The esters of 2-androsten-16-ol produced in accordance with this invention are usually crystalline white solids which are insoluble in water but soluble in a variety of organic solvents. 2-androsten-16-ol and its esters can be administed orally to mammals or by injection. When administered orally, they can be compounded in the form of tablets, or elixirs with inocuous pharmaceutical diluents or they can be in the form of capsules, with or without inocuous diluents. For parenteral administration, they can be suspended in vegetable oil or in propylene glycol.

The invention is disclosed in further detail by means of the following examples which illustrate various embodiments of the invention. It will be understood by those skilled in the art that the procedures given herein are illustrative only and are not intended to limit the invention in scope. Various modifications in operating conditions and equivalent materials can be made without departing from the invention.

EXAMPLE 1

2-androsten-16β-ol acetate

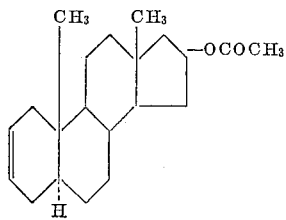

Five grams of 2-androsten-16-one in 200 ml. of methanol was reduced with 3 g. of sodium borohydride for 45 minutes at room temperature. Then 20 ml. of acetone was added to destroy the excess of sodium borohydride and the reaction mixture allowed to stand for 10 minutes. Finally 50 ml. of water was added and the mixture was distilled until turbidity appeared. The mixture was cooled to room temperature and refrigerated. The oily precipitate of 2-androsten-16β-ol solidified and was removed by filtration, washed well with water and dried. It was dissolved in 50 ml. of pyridine and 50 ml. of acetic anhydride was added. The reaction mixture was kept at room temperature for 18 hours, then diluted with 1 liter of cold water and refrigerated. After 2 hours the precipitate of 2-androsten-16β-ol acetate was collected on a filter, washed well with water and dried. After recrystallization from methanol it melted at 138° C.; yield 4.2 g.

EXAMPLE 1A

By a similar procedure to that of Example 1, but using 50 ml. of propionyl chloride in lieu of the acetic anhydride, there is produced 2-androsten-16β-ol propionate. In the same way 2-androsten-16β-ol butyrate can be prepared, using 55 ml. of butyl chloride instead of the acetic anhydride.

EXAMPLE 2

2-androsten-16β-ol

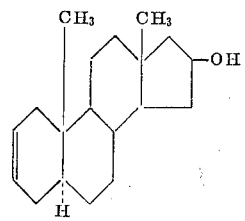

To a solution of 3.2 g. of 2-androsten-16β-ol acetate in 300 ml. of methanol was added a solution of 5 g. of sodium hydroxide in 50 ml. of water. The resulting solution was refluxed for one hour. Then 50 ml. of water was added and the solution distilled until faint turbidity. Upon standing at room temperature the mixture deposited a precipitate of 2-androsten-16β-ol. This was removed, washed thoroughly with water and dried. The 2-androsten-16β-ol thus produced had a melting point of 106.5–107° C.

EXAMPLE 3

2-androsten-16β-ol hydrogen succinate

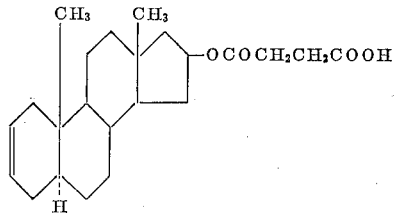

A solution of 2.5 g. of 2-androsten-16β-ol and 3.8 g. of succinic anhydride in 50 ml. of anhydrous pyridine was refluxed for 4 hours protected from moisture. It was then left at room temperature for 15 hours, diluted with 50 ml. of water and heated on a steam bath for 30 minutes. Then 100 ml. of water was added and the pH of the mixture adjusted to 3 with dilute sulfuric acid. The mixture was extracted with 800 ml. of ether, and the ether extract was washed with water until neutral and then extracted with 500 ml. of 0.1 N potassium carbonate solution. The potassium carbonate solution was then acidified and extracted with 600 ml. of ether. The latter extract was washed with water until neutral and then dried with anhydrous sodium sulfate. The ether extract was filtered and evaporated on a steam bath, leaving an oily residue of 2-androsten-16β-ol hydrogen succinate. This was dissolved in 50 ml. of petroleum ether, evaporated to 25 ml. volume, cooled to room temperature and chilled in a freezer for 6 hours. The crystalline residue was removed by decantation and air dried. It was dissolved in 25 ml. of acetone, treated with activated carbon and filtered. The filter was washed with 25 ml. of acetone and the combined acetone solutions were evaporated to about 25 ml. during the addition of six 50-ml. portions of petroleum ether. The resulting solution was cooled to room temperature and chilled in a freezer for 4 hours. The precipitate of 2-androsten-16β-ol hydrogen succinate was isolated by decantation and air dried; M.P. 79–81° C.; yield 2.6 g.

EXAMPLE 4

2-androsten-16β-ol acetoxyacetate

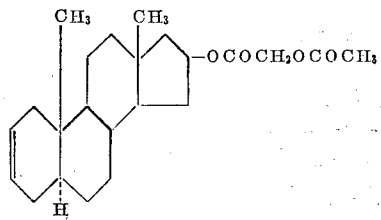

A solution of 870 mg. of 2-androsten-16β-ol and 1.3 g. of acetoxyacetic anhydride in 10 ml. of anhydrous pyridine was allowed to stand at room temperature for 24 hours. It was then diluted with ice water and refrigerated for 15 hours. The precipitate of 2-androsten-16β-ol acetoxyacetate was removed by filtration, washed with water and dried. After recrystallization from 89% methanol, it melted at 112.5–113° C.; yield 680 mg.

EXAMPLE 5

2-androsten-16α-ol

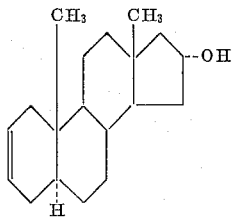

To a cooled solution of 2.3 g. of 2-androsten-16β-ol in 23 ml. of dry pyridine was added 3.2 g. of p-toluenesulfonyl chloride. After an hour in a cold bath the solution was allowed to stand at room temperature for 24 hours. It was then diluted with 460 ml. of ice water containing 3.2 g. of potassium bicarbonate and the precipitate of 2-androsten-16β-ol p-toluenesulfonate was removed by filtration, washed with water and dried in vacuo. It was dissolved in 150 ml. of glacial acetic acid containing 7.0 g. of fused sodium acetate and the solution was refluxed for one hour, then cooled and poured into 600 ml. of ice water containing sufficient sodium hydroxide to neutralize the acetic acid. The mixture was extracted with one liter of n-butanol and the butanol extract was washed with 1.0 N potassium hydroxide solution and with water and evaporated to dryness.

The residues of 2-androsten-16α-ol acetate were dissolved in 750 ml. of methanol and 150 ml. of water containing 33 g. of potassium hydroxide. The solution was refluxed for one hour, then evaporated to about 500 ml. About 350 ml. of hot water was added and the solution evaporated on a steam bath until boiling ceased. The residue liquor was cooled to 25° C. and extracted with one liter of butanol. The butanol solution was washed with dilute potassium hydroxide solution, with 5% sodium chloride solution and with water, then evaporated to dryness. The residue of 2-androsten-16α-ol was recrystallized from petroleum ether (with activated charcoal). It melted at 136–137° C.

EXAMPLE 6

2-androsten-16α-ol acetate

To a solution of 324 mg. of 2-androsten-16α-ol in 5 ml. of dry pyridine was added 5 ml. of acetic anhydride. The resulting solution was left at room temperature for 24 hours, then diluted with 200 ml. of ice water. The precipitate of 2-androsten-16α-ol acetate was removed, washed with water and dried. On recrystallization from aqueous methanol it melted at 107.5° C.

I claim:
1. 2-androsten-16β-ol hemi-ester of a dibasic acid of the formula $HOOC(CH_2)_nCOOH$ wherein $n$ is an integer from 1 to 3, inclusive.
2. 2-androsten-16β-ol hydrogen succinate.
3. 2-androsten-16β-ol lower alkanoxy-lower-alkanoate.
4. 2-androsten-16β-ol acetoxyacetate.

References Cited by the Examiner

UNITED STATES PATENTS 3,103,524   9/1963   Bowers et al. _____ 260—397.5

OTHER REFERENCES

Fajkos et al.: "Coll. Czech. Chem. Comm.," vol. 26, April 1961, pp. 1118–1136.

LEWIS GOTTS, *Primary Examiner.*